United States Patent [19]

Kogashiwa

[11] Patent Number: 4,750,231

[45] Date of Patent: Jun. 14, 1988

[54] COMPACT DISC CLEANER

[76] Inventor: Masaaki Kogashiwa, 1-2-10 Sangenjaya, Setagaya-ku, Tokyo, Japan

[21] Appl. No.: 47,768

[22] Filed: May 8, 1987

[51] Int. Cl.$^4$ ............................................. G11B 3/58
[52] U.S. Cl. ..................................... 15/97 R; 369/72
[58] Field of Search ............ 15/21 R, 21 B, 77, 97 R, 15/102; 369/72; 134/6; 360/137

[56] References Cited

U.S. PATENT DOCUMENTS

| | | | |
|---|---|---|---|
| 4,520,470 | 5/1985 | d'Arc | 15/97 R |
| 4,556,433 | 12/1985 | Clausen | 15/97 R |
| 4,654,917 | 4/1987 | Yeung | 15/97 R |
| 4,662,025 | 5/1987 | Fritsch | 15/97 R |

Primary Examiner—Edward L. Roberts
Attorney, Agent, or Firm—Richard P. Berg

[57] ABSTRACT

A CD cleaner includes a rotary plate on which a CD can be loaded and unloaded and which is supported so as to be capable of corotation with the CD. The rotary plate is mounted on a base so as to be rotatable about a vertical shaft. A unidirectional rotating mechanism is interposed between the rotary plate and the base, and a supporting guide member is movably mounted on the base. Mounted on the guide member is a wiping device which undergoes reciproactive motion in a direction which intersects the rotating direction of the CD supported on the rotary plate.

5 Claims, 4 Drawing Sheets

COMPACT DISC CLEANER

BACKGROUND OF THE INVENTION

This invention relates to a device for cleaning a compact disc (hereinafter referred to as a "CD") on which an audio signal is recorded.

Record player systems in which sounds cut into a record disc such as an LP. disc are played back by a record player are giving way to CD systems in which an audio signal recorded on a CD is played back by a CD player.

Sounds recorded on a CD can be adversely affected by the attachment of dust or the like to the CD, while the attachment of fingerprints, grease and the like can lead to sound distortion or cause the CD player to malfunction. Accordingly, means are required for cleaning a CD in order to remove such contaminants as dust, fingerprints and grease.

Conventionally, the cleaning of a CD is accomplished by wiping the CD surface with chamois, a cleaning cloth or the like. However, there are many cases where the surface of a CD is adversely affected, as by being scratched, when the surface is wiped in the circumferential direction as in the manner of a record disc. Portions of the CD surface may also be left unwiped.

Accordingly, the applicant previously proposed, in Japanese Utility Model Application No. 60-89675, filed on June 14, 1986, a CD cleaner having a base the upper surface of which is formed to include a circular recess in which a CD is rotatably received, and a guide plate supported on the base and having one side edge portion thereof pivoted on the base so that the guide plate is swingable up and down. Formed in the guide plate is a planar guide hole of generally sector shape containing the center of the circular recess and extending from a portion of the outer periphery of the circular recess in the circumferential direction thereof toward the side of the outer periphery. In operation, the CD is fitted in the circular recess of the base, the guide plate is supported on the base, a wiping device having a sheet of suitable material such as chamois on its surface is inserted into the guide hole formed in the guide plate, and the surface of the CD is wiped by the wiping device. Since the guide hole is generally sector shaped, the wiping device does not travel circumferentially of the CD but is constrained to move in a direction intersecting the circumferential direction. As a result, the surface of the CD is not flawed. Further, since the CD is rotated in one direction by the above operation, portions of the CD in the circumferential direction are not left unwiped and all portions of the CD can be wiped substantially uniformly in one revolution of the CD.

However, this previously proposed cleaner has certain disadvantages. Specifically, since the cleaner includes the separately provided wiping device, the latter can be misplaced, requiring the user to search for it when a CD is to be cleaned. Also, the unidirectional rotation of the CD may not take place smoothly, and time is required for the CD to make one full revolution.

SUMMARY OF THE INVENTION

Accordingly, an object of the present invention is to provide a CD cleaner having a wiping device which cannot be misplaced, and in which a CD can be rotated smoothly and reliably in one direction to wipe all portions of the CD in the circumferential direction thereof uniformly in a short period of time without leaving portions unwiped.

According to the present invention, the foregoing object is attained by providing a cleaner for a CD having an audio signal recorded thereon, comprising a base, a rotary plate mounted on the base so as to be rotatable about a vertical shaft, the rotary plate co-rotatably supporting the CD removably placed thereon, a unidirectional rotating mechanism arranged between the rotary plate and the base for rotating the rotary plate in one direction, a supporting guide member movably mounted on the base, and wiping means mounted on the supporting guide member for wiping a surface of the CD supported on the rotary plate, the wiping means being reciprocated in a direction which intersects the direction in which the CD is rotated.

In operation, the CD is supported on the rotary plate and the wiping device is reciprocated while in contact with the surface of the CD. The CD is rotated together with the rotary plate when the wiping device is moved in one direction, and is fixed against rotation together with the rotary plate when the wiping device is moved in the other direction. The surface of the CD is wiped by the wiping device during this stroke of the device. Owing to the provision of the unidirectional rotating mechanism, such as a ratchet mechanism, between the rotary plate and the base, the CD can be rotated in one direction together with the rotary plate smoothly and reliably through substantially equal angular increments with corresponding round-trip movements of the wiping device. Accordingly, the rotary plate and CD make one revolution in a short period of time and all portions of the CD surface in the circumferential direction thereof can be wiped uniformly. Furthermore, since the wiping device travels in a direction which intersects the rotating direction of the CD, namely the circumferential direction thereof, the CD surface is not scratched or flawed in any way. In addition, the wiping device cannot be misplaced since it is retained by the supporting guide mechanism mounted on the base.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A first embodiment of a CD cleaner according to the invention will now be described with reference to FIGS. 1 through 3.

Figure 1:
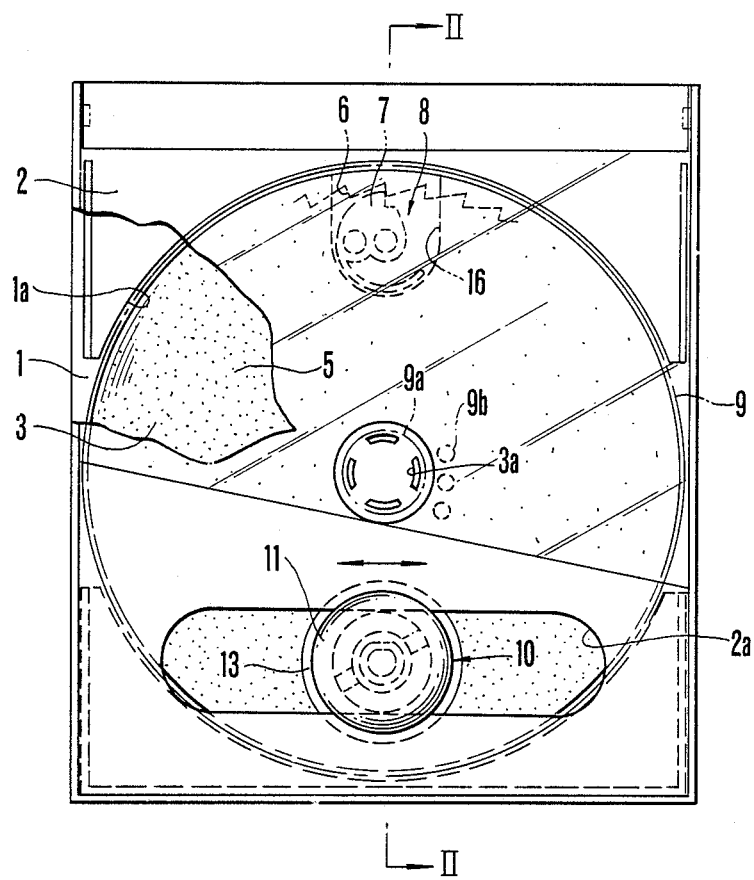
FIG. 1 is a plan view, partially cut away, illustrating an embodiment of a CD cleaner according to the present invention.
Figure 2:
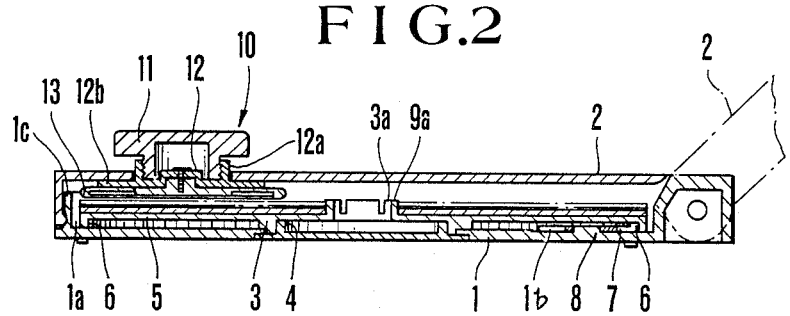
FIG. 2 is a sectional view taken along line II—II of FIG. 1.
Figure 3:
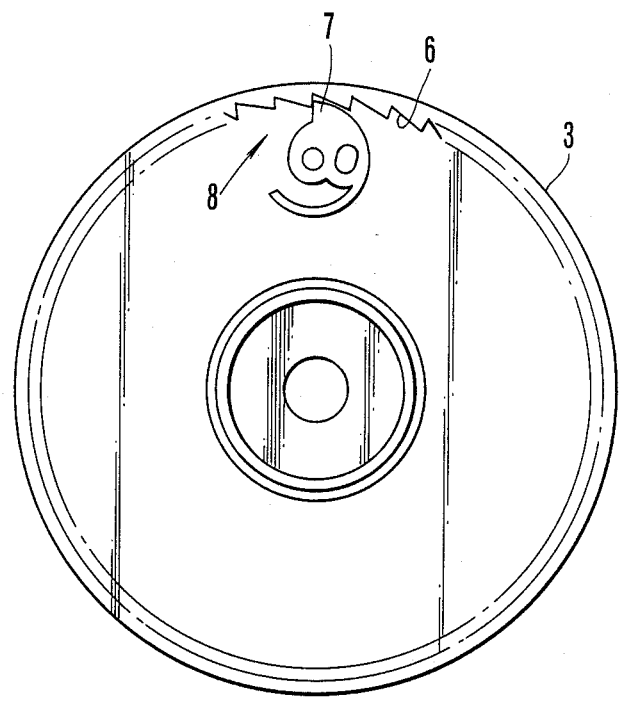
FIGS. 3(a) and 3(b) are views useful in describing a unidirectional rotating mechanism, in which 3(a) is a bottom view of a rotary plate and 3(b) is longitudinal sectional view showing the central portion of the rotary plate.
Figure 3:
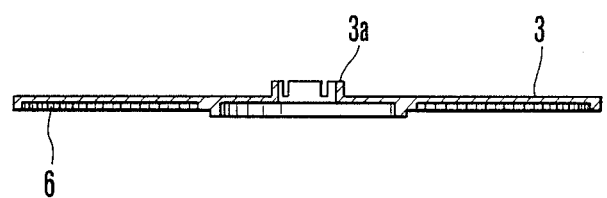

With reference first to FIGS. 1 and 2, there is shown a base 1 consisting of a molded synthetic resin. A supporting guide member 2 also consisting of a molded synthetic resin is pivotally supported on one side edge portion of the base 1 so as to be capable of being swung open and closed. At least a portion of the guide member 2 serving as a cover for the base 1 is transparent. The base 1 has an upper surface formed to include a circular recess 1a open at the top for accommodating a rotary plate 3. The latter is mounted on the base 1 so as to be rotatable about a vertical shaft 4. A rubber sheet 5 is affixed to the upper surface of the rotary plate 3 to prevent sliding. As shown in FIGS. 3(a) and 3(b), the lower surface of the rotary plate 3 has an inner circumferential wall provided with sawtooth-shaped rotating teeth 6 in the manner of an internal gear. A pawl 7 for engaging individual ones of the teeth 6 is secured in a retaining cavity 1b provided in the circular recess 1a of base 1. The teeth 6 and pawl 7 construct a unidirectional rotating mechanism 8, which is interposed between the rotary plate 3 and base 1.

A CD 9 having a center hole 9a is placed on the rubber sheet 5. The central portion of the rotary plate 3 is formed to include a projection 3a which mates with the center hole 9a of CD 9 to resiliently support the CD 9. It should be noted that the circular recess 1a is formed to have a depth which will bring the upper surface of CD 9 supported on the rubber sheet 5 of rotary plate 3 to a height level with or somewhat below the upper surface 1c of the base 1. The guide member 2 is formed to include a guide slot 2a in the side portion thereof opposite that pivotally supported on the base 1, the guide slot 2a extending parallel to this side portion. A wiping device 10 is engaged with and retained by the two longitudinal side edges of the guide slot 2a in such a manner as to be reciprocable longitudinally of the guide slot.

The wiping device 10 includes a knob 11 supported on the guide member 2 and having an outer diameter larger than the transverse width of the guide slot 2a. Detachably screwed onto the knob 11 from the lower end thereof is the shaft portion 12a of a retaining member 12. The shaft portion 12a is fitted loosely through the guide slot 2a and has a disk 12b formed integrally on its lower end. The disk 12b has an outer diameter greater than the transverse width of the guide slot 2a and is arranged on the lower side of the guide slot. The periphery of the disk 12b is covered with a cleaning sheet 13 of chamois, cloth or the like. The sheet 13 is capable of being attached to and detached from the disk 12b and has a diameter slightly larger than the width of a groove for recording an audio signal on the CD.

In order to clean a CD using the cleaner of the embodiment constructed as set forth above, the guide member 2 is opened to the attitude indicated by the phantom lines in FIG. 2, the CD 9 is placed on the rubber sheet 5 of rotary plate 3, and the center hole 9a of the CD 9 is mated with the projection 3a so that the wall portion of the center hole is resiliently supported by the projection 3a. The guide member 2 is then closed to the attitude indicated by the solid lines in FIG. 2. When this is done, the cleaning sheet 13 of wiping device 10 is brought into contact with the surface of the CD 9. The knob 11 is then grasped and the wiping device 10 is moved linearly back and forth along the guide slot 2a provided in the guide member 2, as shown by the arrows in FIG. 1. The direction of back-and-forth movement of wiping device 10 intersects the circumferential direction of the CD 9 and rotary plate 3. When the wiping device 10 is moved leftward in FIG. 1, a clockwise rotating force is applied to the CD 9 by the cleaning sheet 13 of wiping device 10, and the pawl 7 rides over the teeth 6 of the unidirectional rotating mechanism 8, thereby allowing the CD 9, rotary plate 3 and vertical shaft 4 to rotate incrementally in the clockwise direction. When the wiping device 10 is moved rightward in FIG. 1, the pawl 7 engages one of the teeth 6 and thus fixes the rotary plate 3 and CD 9 against counter-clockwise rotation, in which state the surface of CD 9 is swept clean of contaminants by the cleaning sheet 13. If this back-and-forth movement of the wiping device 10 is repeated, the surface of the CD 9 can be cleaned while the rotary plate 3 and CD 9 are rotated clockwise smoothly and reliably through substantially equal angular increments. The entire surface of the CD 9 will have been swept clean when the CD 9 makes one full revolution, which can be ascertained by viewing markers 9b on the CD 9 through the transparent portion of the supporting guide member 13. When the CD 9 has made one revolution, movement of the wiping device 10 is halted, the guide member 13 is opened and the cleaned CD 9 is removed from the rotary plate 3.

Figure 4:
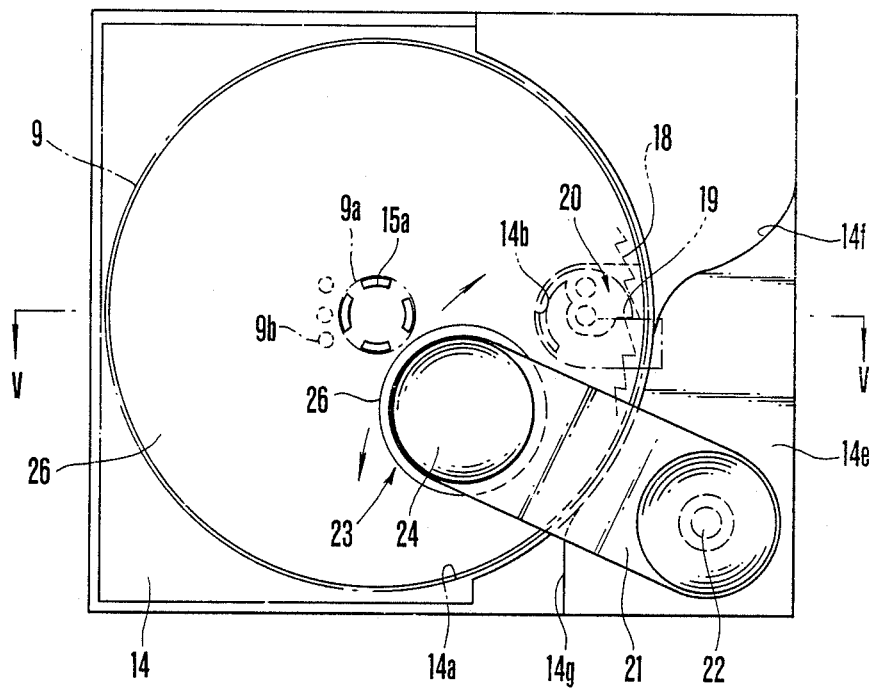
FIG. 4 is a plan view illustrating illustrating another embodiment of a CD cleaner according to the present invention.
Figure 5:
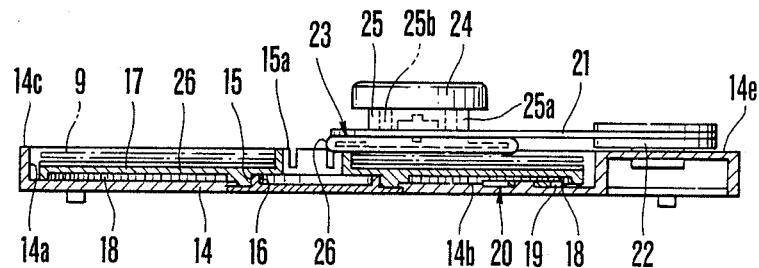
FIG. 5 is a sectional view taken along line V—V of FIG. 4.
Figure 6A:
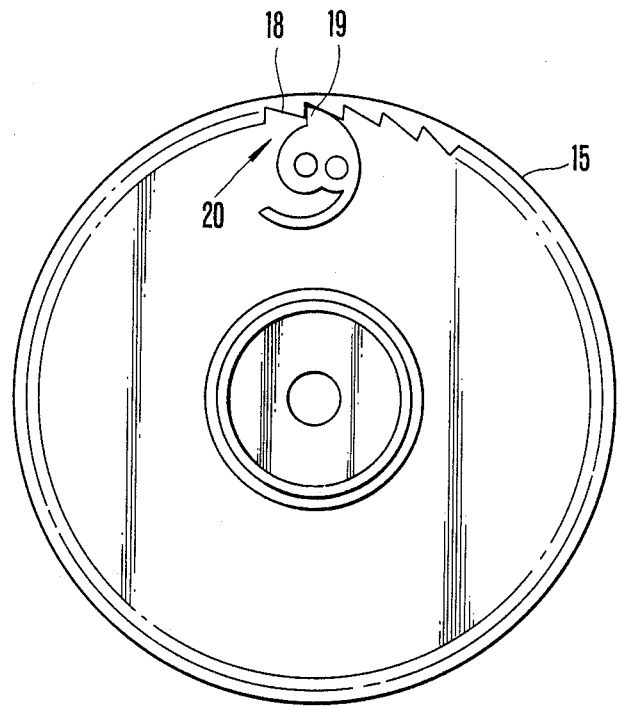
FIGS. 6(a) and 6(b) are views useful in describing a unidirectional rotating mechanism in this embodiment, in which 6(a) is a bottom view of a rotary plate and 6(b) is longitudinal sectional view showing the central portion of the rotary plate in this embodiment.
Figure 6B:
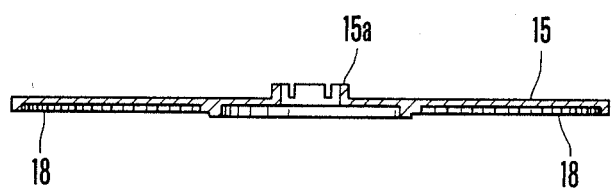

FIGS. 4 through 6 illustrate a second embodiment of a CD cleaner in accordance with the invention. The CD cleaner in this embodiment includes a base 14 consisting of a molded synthetic resin. The base 14 is formed to include a circular recess 14a open at the top for accommodating a rotary plate 15. The latter is mounted on the base 14 so as to be rotatable about a vertical shaft 16. A rubber sheet 17 is affixed to the upper surface of the rotary plate 15 to prevent sliding. As shown in FIGS. 6(a) and 6(b), the lower surface of the rotary plate 15 has an inner circumferential wall provided with sawtooth-shaped rotating teeth 18 having the configuration of an internal gear, just as in the first embodiment. A pawl 19 for engaging individual ones of the teeth 18 is fixedly retained in a retaining cavity 14b provided in the circular recess 14a of base 14. The teeth 18 and pawl 19 construct a unidirectional rotating mechanism 20, which is interposed between the rotary plate 15 and base 14.

The CD 9 having the center hole 9a is placed on the rubber sheet 17. The central portion of the rotary plate 15 is formed to include a projection 15a which mates with the center hole 9a of CD 9 to resiliently support the CD 9. The circular recess 14a is formed to have a depth which will bring the upper surface of CD 9 to a height level with or somewhat below the upper surface 14c of the base 14. The base end portion of a supporting guide member 21 comprising an arm is pivotally supported by a shaft 22 parallel to the vertical shaft 16 on a projection 14e upstanding from one corner of the base 14. The support member 21 has a distal end portion holding a wiping device 23. The wiping device 23 includes a knob 24 provided on the guide member 21. Detachably screwed onto the knob 24 from the lower end thereof is the shaft portion 25a of a retaining member 25. Formed integrally on the shaft portion 25a at its lower end is a disk 25b whose periphery is covered with a cleaning sheet 26 of chamois, cloth or the like. The sheet 26 is capable of being attached to and detached from the disk 25b and has a diameter slightly larger than the width of a groove for recording an audio signal on the CD. The guide member 21 is embraced by the knob 24 above and the disk 25b below, with the lower surface of the sheet 26 being disposed at a height which will bring it into sliding contact with the surface of the CD 9 supported on the rotary plate 15. Stoppers 14f, 14g contacted by the disk 25b via the sheet 26 are formed on both edges of the projection 14e of base 14 on the side of the circular recess 14a. The arrangement is such that the guide member 21 swings about the shaft 22 in such a manner that the wiping device 23 moves back and forth between the stoppers 14f, 14g.

In order to clean the CD using the cleaner of the second embodiment constructed as set forth above, the disk 25b is abutted against the stopper 14f to move the guide member 21 and wiping device 23 clear of the circular recess 14a, in which state the center hole 9a of the CD 9 is mated with the projection 15a of rotary plate 15 and the CD 9 is placed on the rubber sheet 17 overlying the rotary plate 15. The knob 24 is then grasped and the guide member 21 is swung back and forth about the shaft 22, whereby the wiping device 23 is reciprocated along an arcuate path between the stoppers 14f, 14g, as indicated by the arrows in FIG. 4. The direction of back-and-forth movement of wiping device 23 intersects the circumferential direction of the CD 9 and rotary plate 15. When the wiping device 23 is moved clockwise in FIG. 4, a counter-clockwise rotating force is applied to the CD 9 by the cleaning sheet 26 of wiping device 23, and the pawl 19 rides over the teeth 18 of the unidirectional rotating mechanism 20, thereby allowing the CD 9, rotary plate 15 and vertical shaft 16 to rotate incrementally in the counter-clockwise direction. When the wiping device 23 is moved counter-clockwise in FIG. 4, the pawl 19 engages one of the teeth 18 and thus fixes the rotary plate 15 and CD 9 against clockwise rotation, in which state the surface of CD 9 is swept clean of contaminants by the cleaning sheet 26. If this back-and-forth movement of the wiping device 23 is repeated, the surface of the CD 9 can be cleaned while the rotary plate 15 and CD 9 are rotated clockwise smoothly and reliably through substantially equal angular increments. The entire surface of the CD 9 will have been swept clean when the CD 9 makes one full revolution, which can be ascertained by viewing markers 9b on the CD 9. When the CD 9 has made one revolution, reciprocative movement of the wiping device 23 is halted and the wiping device is abutted against the stopper 14f, in which state the cleaned CD 9 is removed from the rotary plate 15.

In the second embodiment, it is preferred that the base 14 be provided with a removable cover to cover the rotary plate 15, guide member 21 and the upper portion of the base 14.

In the illustrated embodiments of the invention, the teeth engaged by the pawl are formed integral with the inner circumferential wall surface of the rotary disk in the manner of an internal gear. However, it is also possible to secure a ratchet wheel, which is formed separately of the rotary plate, to the rotary plate, or to adopt a one-way clutch as the unidirectional rotating mechanism. Adopting the teeth and pawl arrangement of the illustrated embodiments, however, makes it possible to reduce the thickness or height of the cleaner.

In accordance with the present invention as described above, the unidirectional rotating mechanism is interposed between the base and the rotary plate that rotates about the vertical shaft, the wiping device is attached to the supporting guide member provided on the base, and the wiping device is adapted to be reciprocated in a direction which intersects the rotating direction of the CD supported on the rotary plate. The CD is rotated together with the rotary plate by movement of the wiping device in one direction, and the surface of the CD is wiped clean by movement of the wiping device in the other direction, during which time the rotary plate and CD are fixed against rotation. Thus, with each round-trip of the wiping device, the CD is rotated through an angular increment smoothly and reliably in one direction, and these angular increments through which the CD is rotated by corresponding round-trip movements of the wiping device are substantially equal. As a result, the CD makes one revolution in a short period of time and all portions of the CD surface in the circumferential direction thereof are cleaned uniformly without portions being left unwiped. Since the wiping device travels in a direction which intersects the rotating direction of the CD, the surface of the CD is not damaged. Furthermore, since the wiping device is held by the supporting guide member attached to the base, it can never be lost or misplaced.

As many apparently widely different embodiments of the present invention can be made without departing from the spirit and scope thereof, it is to be understood that the invention is not limited to the specific embodiments thereof except as defined in the appended claims.

What is claimed is:

1. A cleaner for a compact disc having an audio signal recorded thereon, comprising:
    a base;
    a rotary plate mounted on said base so as to be rotatable about a vertical shaft, said rotary plate co-rotatably supporting the compact disc removably placed thereon;
    a unidirectional rotating mechanism arranged between said rotary plate and said base for rotating said rotary plate in one direction;
    a supporting guide member movably mounted on said base; and
    wiping means mounted on said supporting guide member for wiping a surface of the compact disc supported on said rotary plate, said wiping means being reciprocated in a direction which intersects the direction in which the compact disc is rotated.

2. The cleaner according to claim 1, wherein said supporting guide member comprises a base cover pivotally attached to one side edge portion of said base so as to be capable of being swung open and closed, said base cover having a guide slot for engaging and supporting said wiping means for reciprocative motion therealong.

3. The cleaner according to claim 2, wherein said base has a circular recess for receiving said rotary plate, said circular recess having such a depth that the surface of the compact disc supported on said rotary plate will be flush with an upper surface of said base.

4. The cleaner according to claim 1, wherein said supporting guide member comprises an arm swingably supported on a side portion of said base by a shaft parallel to said vertical shaft, said arm having a free distal end for holding said wiping means in such a manner that said wiping means is capable of being wiped across the surface of the compact disc.

5. The cleaner according to claim 4, wherein said base has a circular recess for receiving said rotary plate, said circular recess having such a depth that the surface of the compact disc supported on said rotary plate will be flush with an upper surface of said base.

* * * * *

UNITED STATES PATENT AND TRADEMARK OFFICE
CERTIFICATE OF CORRECTION

PATENT NO. : 4,750,231
DATED : June 14, 1988
INVENTOR(S) : Masaaki Kogashiwa

It is certified that error appears in the above-identified patent and that said Letters Patent are hereby corrected as shown below:

Front Page, left-hand column, please insert

---[30] Foreign Application Priority Data

May 22, 1986 Japan........61-77479 ---

Signed and Sealed this

Twenty-first Day of February, 1989

Attest:

DONALD J. QUIGG

Attesting Officer

Commissioner of Patents and Trademarks